B. T. B. HYDE.
CONTAINER TOP.
APPLICATION FILED AUG. 12, 1909.

942,562.

Patented Dec. 7, 1909.

WITNESSES:
Thomas M Smith
G. M. Connerton

INVENTOR
Benjamin T. Babbitt Hyde,
BY J. Walter Douglass
ATTORNEY.

UNITED STATES PATENT OFFICE.

BENJAMIN T. BABBITT HYDE, OF NEW YORK, N. Y.

CONTAINER-TOP.

942,562.

Specification of Letters Patent.

Patented Dec. 7, 1909.

Application filed August 12, 1909. Serial No. 512,523.

*To all whom it may concern:*

Be it known that I, BENJAMIN T. BABBITT HYDE, a citizen of the United States, residing at the city of New York, in the county of New York and State of New York, have invented certain new and useful Improvements in Container-Tops, of which the following is a specification.

My invention has relation to a container top for pulverulent materials, consisting of a fixed disk and a movable disk pivoted to each other and provided with triangular-shaped perforations arranged so that the base of each is adjacent to the center of the top instead of adjacent to the periphery thereof so that in operating one with respect to the other to gradually enlarge the openings so that the material in the container may be sifted out at a series of points in the direction of the center of the top rather than toward the periphery and by such concentrating of the siftings to effect economy in waste in the removal of the material from the container.

The nature and characteristic features of my present invention will be more fully understood from familiar examples of the prior art as exhibited in the Patents Nos. 546,526, of September 17th, 1895, and 853,547, of May 14th, 1907, from the accompanying drawings taken in connection with the following description of my invention, in which—

Figure 1:
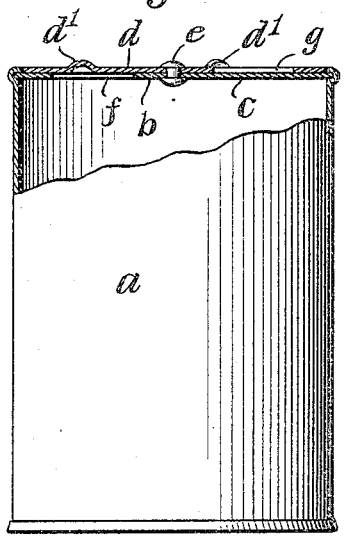
Figure 2:
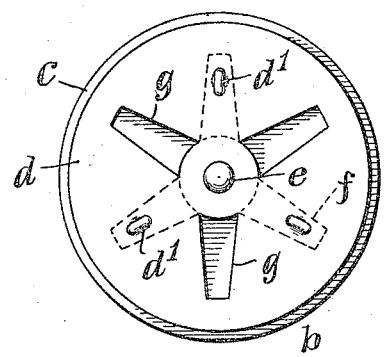
Figure 3:
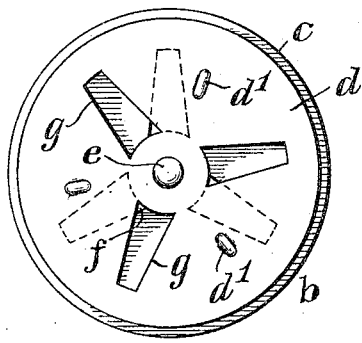
Figure 4:
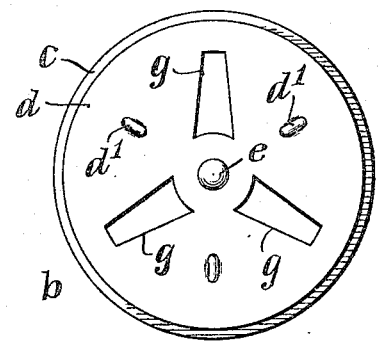

Figure 1, is a view partly in elevation and partly in broken section of a container top embodying the particular main features of my said invention. Fig. 2, is a top or plan view of Fig. 1, showing the triangular openings therein; and Figs. 3 and 4, are respectively, similar views of the container top, showing the perforations of the respective disks thereof arranged so as to provide triangular shaped openings of different sizes, for the sifting therethrough of the contents of the container.

Referring to the drawings $a$, is a broken section of one form of metal or other container having a top $b$, consisting of two disks $c$ and $d$, pivoted centrally at $e$, to each other; the disk $c$, being fixed and the other disk $d$, being movable over the disk $c$, by means of a series of projections $d^1$, struck up therefrom. In each of these disks $c$ and $d$, at suitable distances apart are provided triangular-shaped perforations $f$ and $g$. These openings being normally in staggered relationship to each other, and the openings arranged so that the wide bases of these triangular-shaped perforations of both disks are from a center point of the disks $c$ and $d$, instead as hitherto from the periphery of the disks, toward the center of the top, whereby gradually in the shifting of the movable disk $d$, over the fixed disk $c$, can the respective openings be enlarged to enable the material of the container to always sift through the series of openings from about the center of the top thus to reduce in the siftings waste to a minimum as well as concentrating more thoroughly the siftings from the container, which is generally desirable as experience has demonstrated, in the handling of different kinds of pulverulent materials from small containers.

Having thus described the nature and objects of my invention, what I claim as new and desire to secure by Letters Patent is:—

1. A container having a top, consisting of two disks, one fixed and the other pivoted thereto, each of said disks having oblong perforations radially arranged from the central imperforate portion of the top, said perforations being wider toward the central portion of the top than toward the periphery of said disks, substantially as and for the purposes described.

2. A container having a top, consisting of two disks, one fixed and the other pivoted thereto, each of said disks having oblong perforations radially arranged from the central portion of the top, said perforations being wider toward the central imperforate portion of said top than toward the periphery of said disks and means forming part of one of said disks to permit of shifting one disk over the other, substantially as and for the purposes described.

In witness whereof, I have hereunto set my signature in the presence of two subscribing witnesses.

BENJAMIN T. BABBITT HYDE.

Witnesses:
W. I. JOHNSON,
ARTHUR H. HACKER.